United States Patent
Leobandung (10) Patent No.: US 11,301,752 B2
(45) Date of Patent: Apr. 12, 2022

(54) MEMORY CONFIGURATION FOR IMPLEMENTING A NEURAL NETWORK

(71) Applicant: International Business Machines Corporation, Armonk, NY (US)

(72) Inventor: Effendi Leobandung, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 15/791,652

(22) Filed: Oct. 24, 2017

(65) Prior Publication Data

US 2019/0122102 A1    Apr. 25, 2019

(51) Int. Cl.
*G06N 3/08* (2006.01)

(52) U.S. Cl.
CPC ..................... *G06N 3/08* (2013.01)

(58) Field of Classification Search
CPC ........ G06N 3/06; G06N 3/063; G06N 3/0635; G06N 3/08; G06N 3/084; G06N 7/04; G06N 7/043
See application file for complete search history.

(56) References Cited

U.S. PATENT DOCUMENTS

| | | | | |
|---|---|---|---|---|
| 5,200,816 A * | 4/1993 | Rose | .................... | H04N 1/6019 358/518 |
| 5,648,627 A * | 7/1997 | Usa | ..................... | G10H 1/0556 84/600 |
| 5,649,065 A * | 7/1997 | Lo | ...................... | H03H 17/0255 706/22 |
| 5,740,326 A | 4/1998 | Boulet et al. | | |
| 5,790,754 A * | 8/1998 | Mozer | .................... | G10L 15/16 704/232 |
| 6,269,351 B1 * | 7/2001 | Black | ..................... | G06F 16/30 706/15 |
| 6,594,630 B1 * | 7/2003 | Zlokarnik | .............. | G10L 15/26 704/256.5 |
| 6,844,582 B2 * | 1/2005 | Ueda | ................... | G06N 3/0635 257/295 |
| 9,129,220 B2 * | 9/2015 | Aparin | .................. | G06N 3/088 |
| 9,715,656 B1 * | 7/2017 | Gokmen | ............... | G06N 3/063 |

(Continued)

OTHER PUBLICATIONS

Konig et al., "A Cell Library of Scalable Neural Network Classifiers for Rapid Low-Power Vision and Cognition Systems Design", Sep. 2000, Fourth International Conference on Knowledge-Based Intelligent Engineering Systems & Allied Technologies, pp. 275-282. (Year: 2000).*

(Continued)

*Primary Examiner* — Paulinho E Smith
(74) *Attorney, Agent, or Firm* — L. Jeffrey Kelly; Ryan, Mason & Lewis, LLP (57) ABSTRACT

Weights of a neural network are initialized by programming a plurality of unit cells. A given one of the plurality of unit cells includes one or more static random-access memory cells and a digital to analog converter device. The digital to analog converter device is configured to receive one or more outputs produced by respective ones of the one or more static random-access memory cells. An amount of error associated with the initialized weights is determined. The initialized weights are adjusted in response to the amount of error exceeding a threshold amount of error.

20 Claims, 4 Drawing Sheets

(56) References Cited

U.S. PATENT DOCUMENTS

| | | | |
|---|---|---|---|
| 9,779,355 | B1* | 10/2017 | Leobandung ........... G06N 3/084 |
| 10,848,167 | B1* | 11/2020 | Far ......................... H03M 1/002 |
| 10,860,924 | B2* | 12/2020 | Burger ............... H04L 25/03095 |
| 2016/0294407 | A1* | 10/2016 | Kikuta .................... H03M 1/08 |
| 2016/0335536 | A1* | 11/2016 | Yamazaki ............ G06N 3/0454 |
| 2017/0032222 | A1* | 2/2017 | Sharma ................ G06K 9/4619 |
| 2017/0091951 | A1* | 3/2017 | Yoo ........................... G06T 7/11 |
| 2017/0102920 | A1 | 4/2017 | Henry et al. |
| 2017/0200078 | A1 | 7/2017 | Bichler |
| 2017/0213129 | A1* | 7/2017 | Lee ........................... G06N 3/04 |
| 2018/0253642 | A1* | 9/2018 | Gokmen ................. G06N 3/084 |
| 2018/0300629 | A1* | 10/2018 | Kharaghani ......... G06N 3/0472 |
| 2019/0080243 | A1* | 3/2019 | David .................... G06N 3/086 |
| 2019/0087719 | A1* | 3/2019 | Seo ........................ G11C 11/412 |
| 2019/0122102 | A1* | 4/2019 | Leobandung ........ G06N 3/0454 |
| 2019/0246929 | A1* | 8/2019 | Angle .................. A61B 5/7267 |
| 2019/0370662 | A1* | 12/2019 | Song ....................... G06N 7/005 |
| 2020/0099954 | A1* | 3/2020 | Hemmer .............. H04N 19/597 |
| 2020/0364577 | A1* | 11/2020 | Le Gallo-Bourdeau ..................... G06N 3/084 |

OTHER PUBLICATIONS

Yuan Yao, "Design and Implementation of High-Speed Low-Power Analog-to-Digital and Digital-to-Analog Converters", May 14, 2010, pp. 1-100 (Year: 2010).*

John Vernon Arthur, "Learning in Silicon: A Neuromorphic Model of the Hippocampus", 2006, pp. 1-226 (Year: 2006).*

Alciatore et al., "Introduction to Mechatronics and Measurement Systems", 2011, McGraw Hill, 4th edition, pp. 1-552 (Year: 2011).*

Imran Shamim, "Design, Simulation, and Layout of a Serial Digital-to-Analog Converter (DAC) Array for On-Chip, Analog Parameter Control," University of Maryland, Jul. 22, 2007, 41 pages.

R. Wang et al., "An SRAM-based Implementation of a Convolutional Neural Network," IEEE Biomedical Circuits and Systems Conference (BioCAS), Oct. 17-19, 2016, pp. 560-563.

* cited by examiner

MEMORY CONFIGURATION FOR IMPLEMENTING A NEURAL NETWORK

BACKGROUND

An artificial neural network, referred to herein as a neural network, implements machine learning and training for cognitive computing that improves task performance over time by "learning" from previous examples. For example, in the context of image recognition, a neural network may learn how to identify images that contain an object by analyzing training images tagged as either having that object or not having that object. The neural network may then use these results in order to autonomously identify the object in different images.

SUMMARY

Embodiments of the present invention relate to techniques for implementing neural networks.

For example, in one embodiment, an apparatus to implement neural networks comprises circuitry configured to implement a neural network and comprising a plurality of unit cells. A given one of the plurality of unit cells comprises one or more static random-access memory cells and a digital to analog converter device. The digital to analog converter device is configured to receive one or more outputs produced by respective ones of the one or more static random-access memory cells. The apparatus further comprises at least one processor operatively coupled to a memory and configured to initialize weights of the neural network by programming the unit cells; determine an amount of error associated with the initialized weights; and adjust the initialized weights in response to the amount of error exceeding a threshold amount of error.

In another embodiment, a method for implementing neural networks comprises initializing weights of the neural network by programming a plurality of unit cells. A given one of the plurality of unit cells comprises one or more static random-access memory cells and a digital to analog converter device. The digital to analog converter device is configured to receive one or more outputs produced by respective ones of the one or more static random-access memory cells. An amount of error associated with the initialized weights is determined. The initialized weights are adjusted in response to the amount of error exceeding a threshold amount of error. The steps of the method are implemented by at least one processing device comprising a processor operatively coupled to a memory.

In yet another embodiment, an article of manufacture for implementing neural networks comprises a processor-readable storage medium for storing processor-readable program code which, when executed, causes at least one processor to implement a neural network by performing steps of: initializing weights of the neural network by programming a plurality of unit cells, with a given one of the plurality of unit cells comprising one or more static random-access memory cells and a digital to analog converter device configured to receive one or more outputs produced by respective ones of the one or more static random-access memory cells; determining an amount of error associated with the initialized weights; and adjusting the initialized weights in response to the amount of error exceeding a threshold amount of error.

DETAILED DESCRIPTION

A neural network may be viewed as an interconnected group of artificial neurons (nodes) by which the output of one node is connected to the input of another, similar to how the neurons in an animal brain are structured. Each node may have an associated learnable weight and/or bias. A weight may refer to a strength or amplitude of the connection between two nodes, and a bias may refer to an adjustment factor associated with a given node. A given node will "fire" based on the results of an activation function of the given node. The activation function defines the output of a node based on an input or set of inputs.

Two general classes of neural networks are feedforward neural networks and recurrent neural networks (RNNs).

A feedforward neural network is a neural network where connections between the nodes do not form a cycle or loop. That is, information in a feedforward neural network moves in one direction only. Within the feedforward neural network class are single-layer perceptrons (SLPs) and multi-layer perceptrons (MLPs). The advantage of MLPs over SLPs is that MLPs are capable of distinguishing data that is not linearly separable.

An SLP is a feedforward neural network comprising an input layer of nodes and an output layer of nodes, with the nodes of the input layer being connected directly to the nodes of the output layer using respective weights. The activation function of a given node of the input layer will cause the given node to fire if the value is above a given threshold.

In contrast, an MLP is a feedforward neural network comprising at least three total layers of nodes, including an input layer, an output layer, and at least one "hidden" layer between the input and output layers. Each node in a layer has directed connections to the nodes of the subsequent layer (e.g., each node in the input layer has directed connections to the nodes of the subsequent hidden layer). Except for the nodes of the input layer, each node of the MLP uses a nonlinear activation function. For example, a sigmoid function may be used as the activation function. The term sigmoid function refers to a function having a characteristic sigmoid curve. An example of a sigmoid function is the logistic function.

One type of MLP is a convolutional neural network (CNN). A CNN comprises an input layer, an output layer, and multiple hidden layers, with the multiple hidden layers comprising convolutional, pooling and fully connected layers.

In contrast to feedforward neural networks, RNNs are neural networks where connections between the nodes form directed cycles or loops. Such an arrangement allows an RNN to demonstrate dynamic temporal behavior. Examples of RNNs include, but are not limited to, long short-term memory, bi-directional and continuous time.

Further details regarding feedforward neural networks and RNNs are known in the art, and will not be discussed herein.

Learning or training occurs in neural networks by changing the weights after a given batch of data is processed based on an amount of error in the output as compared to the expected output. Neural networks may utilize backpropagation techniques to calculate the error contribution of each node of the output layer after the given batch of data is processed in order to minimize the error. For example, the error may be calculated by calculating the gradient of the loss function. Generally, the error calculated by backpropagation may then be used by an optimization algorithm to adjust the weights in order to minimize the error, thereby completing the learning process for the given batch of data.

Further details regarding implementing backpropagation techniques with respect to feedforward neural networks and RNNs are known in the art, and will not be discussed herein.

Figure 1:
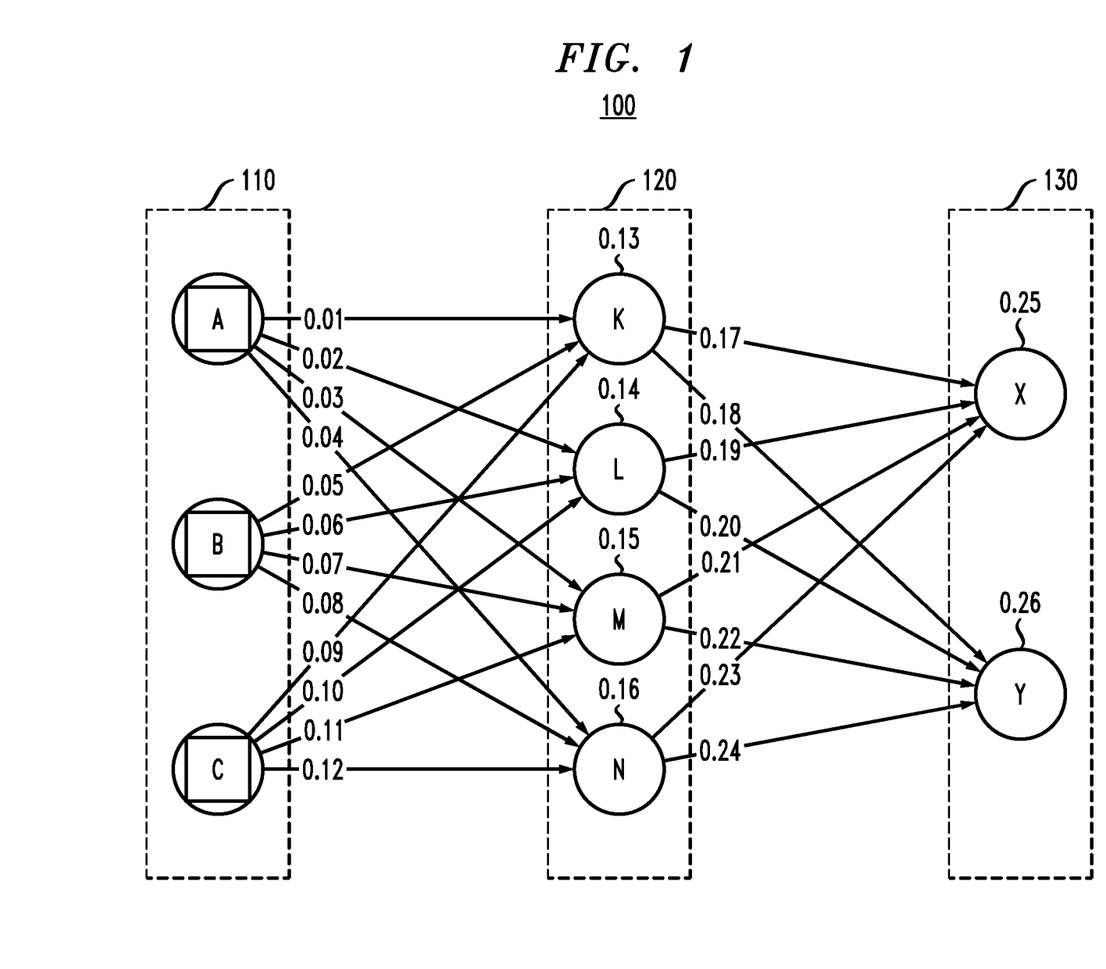
FIG. 1 depicts a diagram illustrating an exemplary neural network.

FIG. 1 depicts a diagram of an exemplary neural network 100. As shown, neural network 100 is a multi-layer perceptron feedforward neural network comprising input layer 110, hidden layer 120 and output layer 130. Although FIG. 1 depicts a feedforward neural network where connections between the nodes do not form a cycle or loop in the neural network, the neural network may in other embodiments be a neural network where connections between the nodes form cycles and/or loops in the neural network (e.g., an RNN). Additionally, it is to be understood that the number of nodes in each of the layers is purely exemplary, and it is to be appreciated that any number of nodes may be comprised within each respective layer in accordance with the embodiments described herein.

Each node in input layer 110 has some initial value ascribed to it (e.g., values A, B and C). Each node in input layer 110 is connected to the nodes of hidden layer 120, with each connection having an associated weight value. The values of the nodes in hidden layer 120 are determined as linear combinations of the weighted values of the nodes in input layer 110, plus an optional bias value corresponding to each node in the output layer. For example, the value K is determined as A(0.01)+B(0.05)+C(0.09)+0.13.

Similarly, each node in hidden layer 120 is connected to the nodes of output layer 130, with each connection having an associated weight value. The values of nodes in output layer 130 are determined as linear combinations of the weighted values of the nodes in hidden layer 120, plus an optional bias value corresponding to each node in the output layer. For example, the value X is determined as K(0.17)+L(0.19)+M(0.21)+N(0.23)+0.25.

As discussed above, one or more backpropagation techniques may be used to adjust at least a portion of the weights in neural network 100.

A neural network, such as the neural network of FIG. 1, may be implemented as software or hardware. However, the hardware implementation is generally more efficient than the software implementation. Different neuronal computation elements have been proposed for use as weights in the implementation of neural networks. A variety of different types of random-access memory (RAM), such as resistive RAM (RRAM), magnetoresistive RAM (MRAM) and phase change memory (PCM) have been proposed, as well as floating-gate metal-oxide-semiconductor field-effect transistors (FGMOS).

However, the utilization of these memory devices as conventional neuronal computation elements suffers from a variety of drawbacks. For example, such conventional neuronal computation elements are not substantially symmetric. Moreover, such conventional neuronal computation elements require the use of an analog input. Thus, such conventional neuronal computation elements are relatively difficult to control.

To address the drawbacks of these previously proposed neuronal computation elements, the illustrative embodiments herein implement a crossbar circuit comprising a plurality of unit cells each comprising one or more static RAM (SRAM) cells. Advantageously, SRAM memory devices are more stable than the above-referenced other types of memory devices. In addition, the input of SRAM is digital as opposed to analog, making it easier to control the neuronal computation element.

To account for the digital output of the SRAM memory cells, each unit cell may further comprise a digital/analog converter (DAC) to receive the outputs produced by the static random-access memory cells. In one embodiment, the DAC comprises a resistor ladder. As is known in the art, a resistor ladder is an electrical circuit made from repeating units of resistors. The resistor ladder may be what is known in the art as an R-2R resistor ladder. While a resistor ladder is used in the illustrative embodiments described herein, other DAC circuit implementations can also be used.

Figure 2:
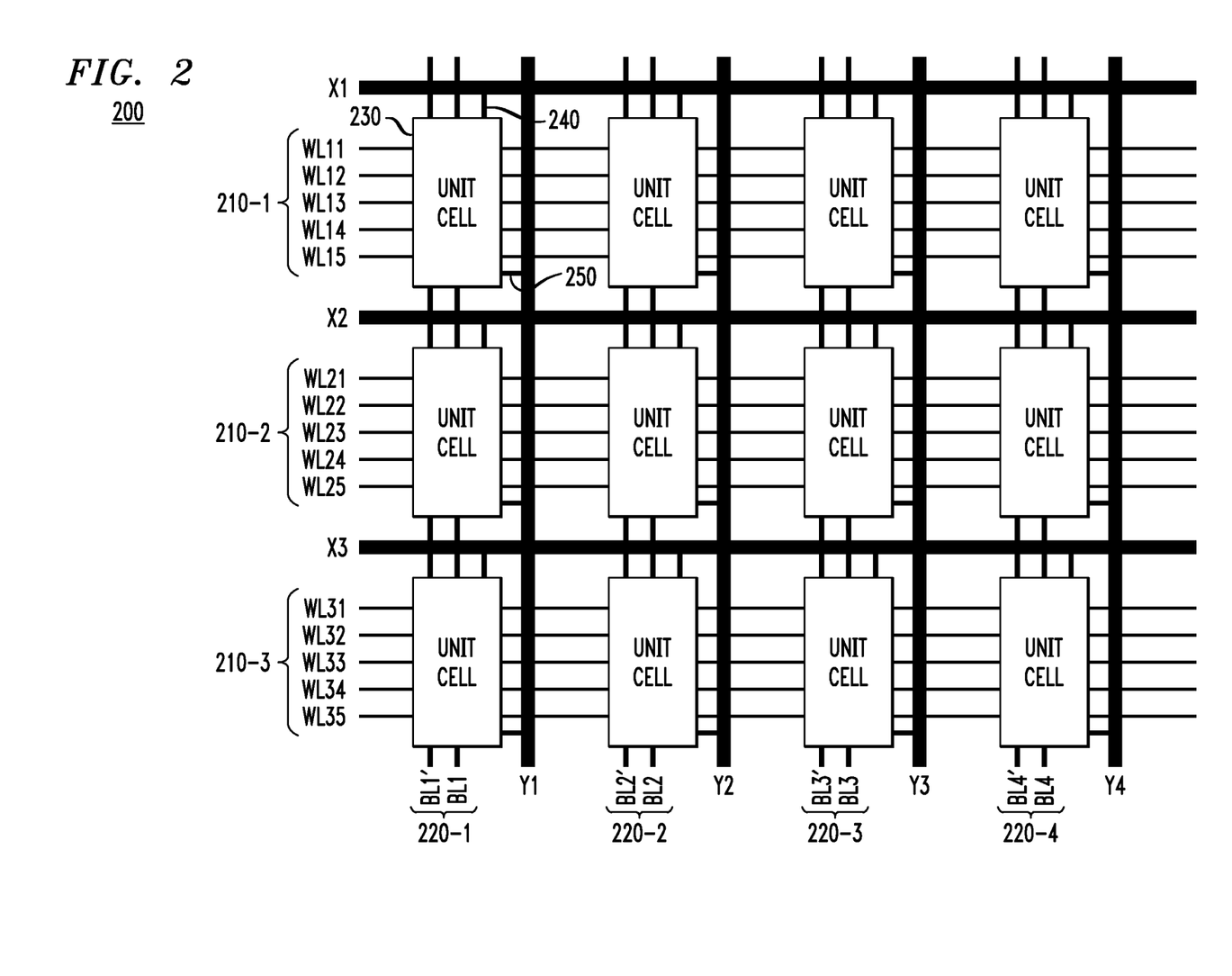
FIG. 2 depicts a block diagram illustrating an apparatus to implement neural networks, according to an embodiment of the present invention.

FIG. 2 depicts a block diagram of an exemplary apparatus 200 to implement weights in the neural network. As shown, apparatus 200 is depicted as a crossbar circuit comprising an SRAM matrix. The crossbar circuit may have variable resistances serving as the weights and/or biases of the neural network. The crossbar circuit acts like an analog matrix multiple for neural network operation, where the sum of current through each column in the crossbar circuit represents a sum to a perceptron on the next layer.

Apparatus 200 is shown comprising sets of word-lines, which illustratively include set of word-lines 210-1, set of word-lines 210-2 and set of word-lines 210-3. Although each set of word-lines 210-1 through 210-3 comprises five word-lines, the number of word-lines in each set of word-lines 210-1 through 210-3 should not be considered limiting. In addition, apparatus 200 comprises sets of bit-lines, which illustratively include set of bit-lines 220-1, set of bit-lines 220-2, set of bit-lines 220-3 and set of bit-lines 220-4. Each set of bit-lines 220-1 through 220-4 comprises a bit-line and its complementary bit-line. For example, set of bit-lines 220-1 comprises bit-line BL1 and complementary bit-line BL1'. It is to be understood that the number of sets of word-lines and the number of sets of bit-lines shown in FIG. 2 are purely exemplary, and any number of sets of word-lines and/or sets of bit-lines may be implemented within the crossbar circuit in accordance with the embodiments described herein.

Apparatus 200 is shown comprising an array of twelve unit cells, including unit cell 230, arranged in three rows and four columns to provide four analog outputs Y1 through Y4 from respective transistors comprised within the unit cells. These analog outputs may represent four programmed weights. In one embodiment, unit cell 230 is programmed by its corresponding bit-lines and word-lines to produce a weighted value for use in a neural network. The number and arrangement of unit cells in the array should not be considered limiting. Apparatus 200 is further shown comprising three power supply lines X1 through X3, which provide current to the unit cells in the array of unit cells.

As shown, unit cell 230 is addressed by set of word-lines 210-1 and set of bit-lines 220-1. That is, unit cell 230 may be programmed via its complementary bit-lines (BL1 and BL1') and word-lines (WL11 through WL15). Set of bit-lines 220-1 determines the state of unit cell 230 when the set of word-lines 210-1 transition from a first level to a second level. As further shown, source line 240 is connected to X1 from a transistor located within unit cell 230 (not shown), and drain line 250 is connected to Y1 from the transistor located within unit cell 230.

Figure 3:
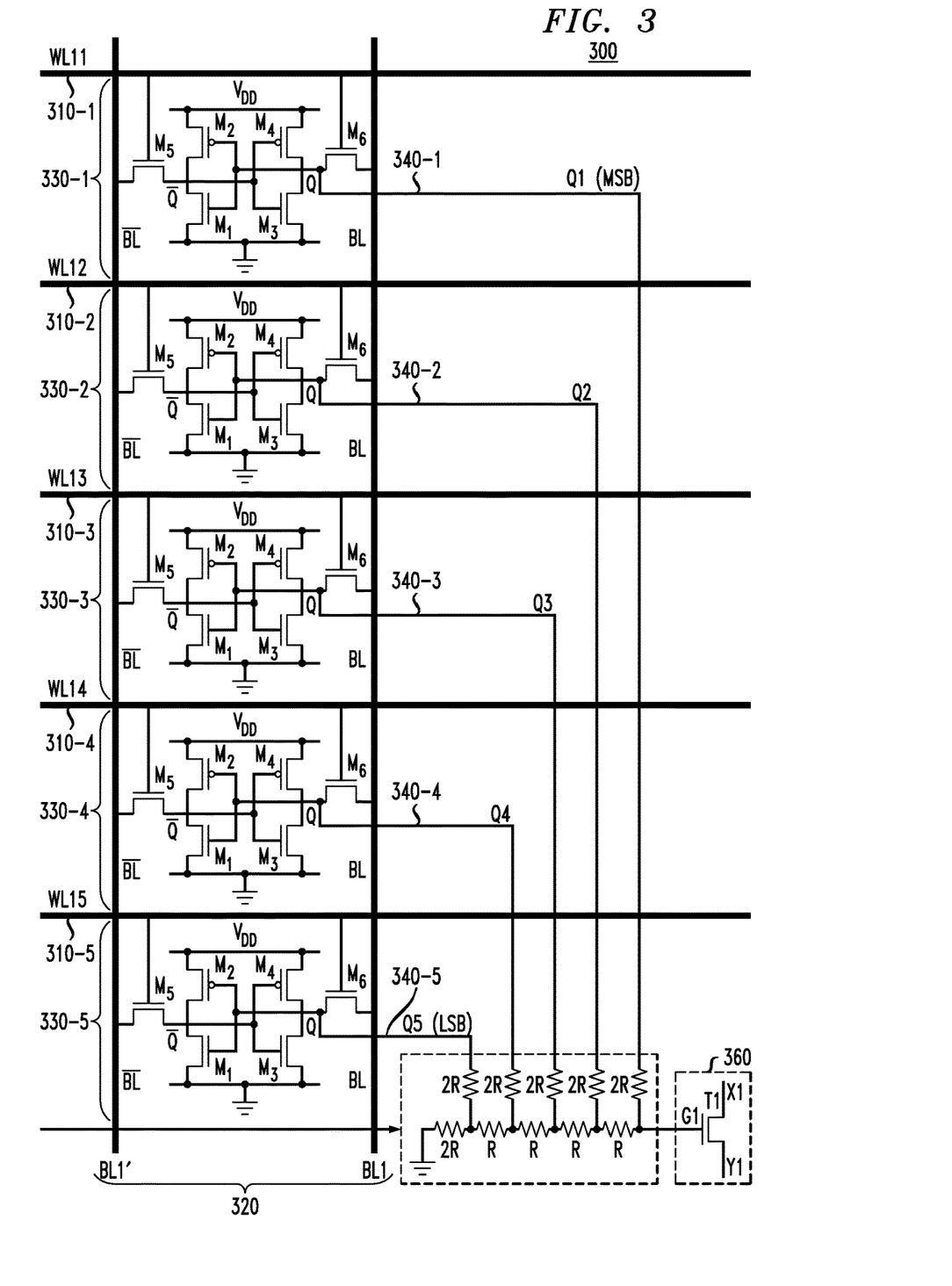
FIG. 3 depicts a schematic diagram illustrating a unit cell of the apparatus of FIG. 2, according to an embodiment of the present invention.

Further details regarding the implementation of unit cell 230 will now be discussed with reference to FIG. 3. FIG. 3 depicts a schematic diagram 300 illustrating a blown-up view of a portion of apparatus 200 of FIG. 2 associated with unit cell 230 of FIG. 2.

As shown, the unit cell illustratively comprises five individual SRAM cells 330-1 through 330-5, which are connected to respective word-lines 310-1 through 310-5 and set of bit-lines 320. Set of bit-lines 320, which includes bit-line BL1 and complementary bit-line BL1', is connected to each SRAM cell 330-1 through 330-5.

A given one of SRAM cells 330-1 through 330-5 illustratively comprises six transistors. For example, SRAM cell 330-1 includes four transistors M1 through M4 that form a cross-coupled inverter, and two programming transistors M5 and M6 gated by word-line 310-1 coupling the cross-coupled inverter to set of bit-lines 320. Programming each of the SRAM cells occurs by setting BL1 and BL1' of set of bit-lines 320 to desired program values (i.e., to "1" or "0"), and transitioning the respective word-lines 310-1 through 310-5 from a low state to a high state.

SRAM cells 330-1 through 330-5 generate respective outputs 340-1 through 340-5. Output 340-1 of SRAM cell 330-1 illustratively represents the most significant bit (MSB) of DAC device 350, while output 340-5 of SRAM cell 330-5 illustratively represents the least significant bit (LSB) of DAC device 350.

The unit cell further comprises digital to analog converter (DAC) device 350 coupled to outputs 340-1 through 340-5. The coupling of outputs 340-1 through 340-5 to DAC device 350 provides an analog voltage level to the gate (G1) of read-out transistor (T1) 360. The level of the gate voltage controls the impedance of read-out transistor 360, thereby enabling a substantially precise current to flow.

As discussed above, DAC device 350 may be embodied as a resistor ladder. The resistor ladder may be comprised of precision resistor material, such as polysilicon, back-end-of-line (BEOL) metal, etc. For example, and as shown in the illustrative FIG. 3 embodiment, DAC device 350 is embodied as an R-2R resistor ladder. In the R-2R resistor ladder embodiment, outputs 340-1 through 340-5 are coupled to respective pull-up resistors of the R-2R resistor ladder. Implementing SRAM cells 330-1 through 330-5 with the R-2R resistor ladder allows for a resolution of $2^5$ or 32 voltage levels or states to be set on the gate of read-out transistor 360. The resolution may be adjusted as desired in other embodiments by increasing or decreasing the number of SRAM cells in combination with DAC device 350. For example, adding one additional SRAM cell will double the resolution, while removing one SRAM cell will halve the resolution. In another embodiment, DAC device 350 is embodied as a field effect transistor (FET). The FET may be turned off to reduce power when it is not being read.

Referring back to FIG. 2, weights are initialized for respective ones of the unit cells of the SRAM matrix of apparatus 200 by programming the unit cells. After all of the weights of the unit cells have been initialized, forward propagation of the neural network is performed. An amount of error is determined and, if necessary, the initial weights are updated based on the amount of error determined. For example, the amount of error may be compared to an expected amount of error in order to determine if the amount of error exceeds a threshold. One or more backpropagation techniques may be used to determine the error and adjust the weights based on the error. This process may be repeated until the error is acceptable.

Figure 4:
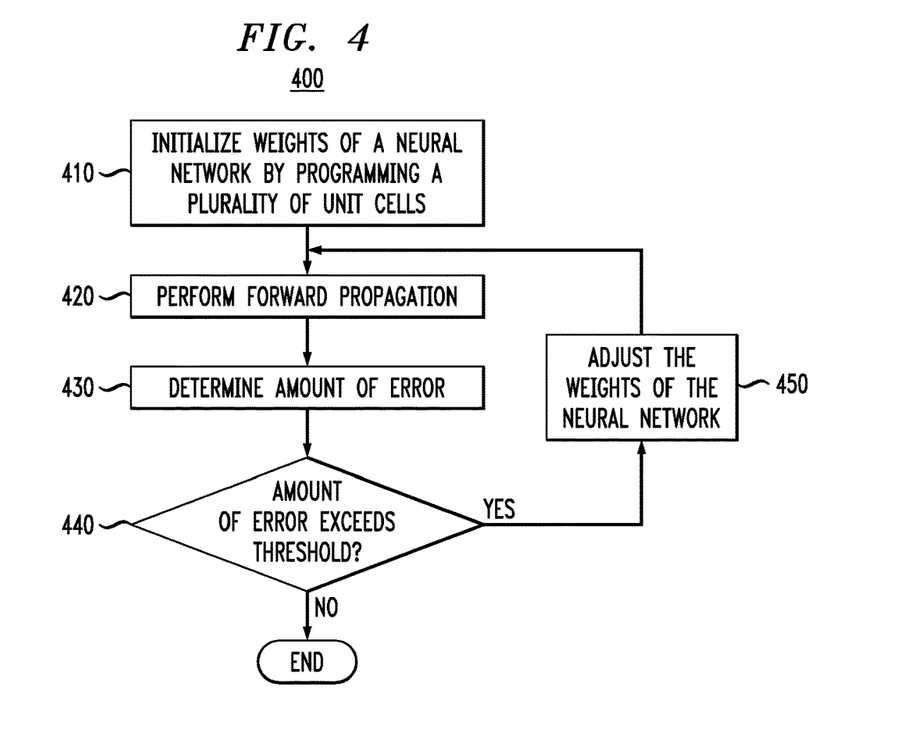
FIG. 4 depicts a flowchart illustrating an overview of a process for implementing neural networks, according to an embodiment of the present invention.

With reference to FIG. 4, flow chart 400 is provided illustrating an overview of a process implementing weights within a neural network.

At step 410, weights of a neural network are initialized by programming a plurality of unit cells. The weights may be associated with connections between nodes in the neural network. The neural network may be a feedforward neural network (e.g., SLP, MLP, CNN), an RNN, or any type of neural network having weights that may be initialized in accordance with the embodiments described herein.

A given one of the plurality of unit cells comprises one or more static random-access memory cells and a digital to analog converter device. The digital to analog converter device is configured to receive one or more outputs produced by respective ones of the one or more static random-access memory cells. In one embodiment, the DAC device is a resistor ladder, such as an R-2R resistor ladder. In another embodiment, the DAC device is a FET.

At step 420, forward propagation is performed.

At step 430, an amount of error is determined.

At step 440, it is determined if the amount of error exceeds a threshold. For example, the amount of error may be compared to an expected amount of error in order to determine if the amount of error exceeds a threshold. One or more backpropagation techniques may be used to determine the amount of error and adjust the weights based on the error at steps 430 and 440. Any backpropagation technique known in the art may be used to determine the amount of error and/or adjust the weights of the neural network, in accordance with the embodiments described herein.

If it is determined at step 440 that the amount of error does not exceed the threshold, then there is no need to adjust any of the weights of the neural network, and the process ends.

However, if it is determined at step 440 that the amount of error does exceed the threshold, this means that the neural network needs to be corrected to account for this error. To do this, the weights of the neural network are adjusted at step 450, and the process then returns to step 420 to in order to determine whether the updated weights themselves need to be updated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
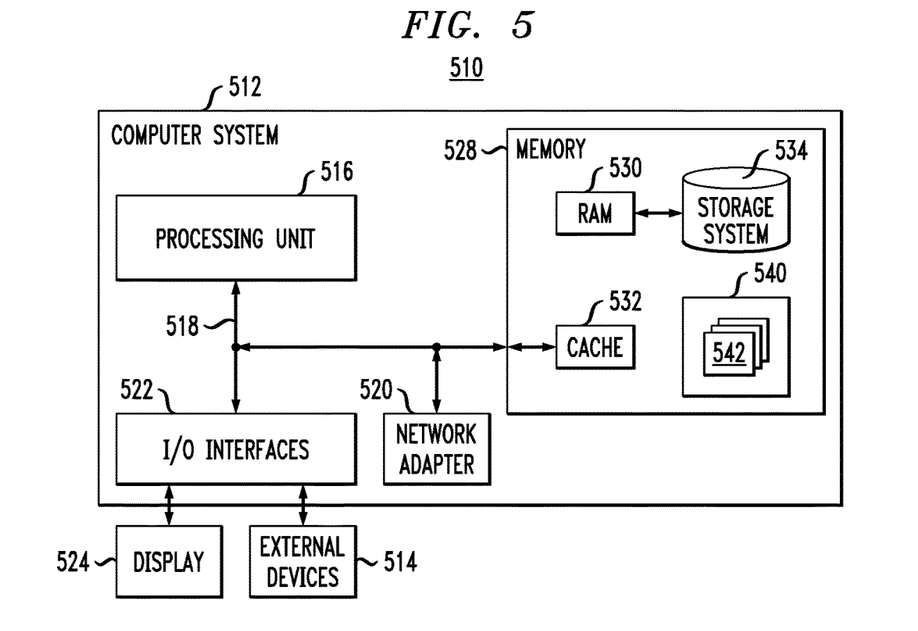
FIG. 5 depicts a computer system in accordance with which one or more components/steps of techniques of the invention may be implemented, according to an embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, system memory 528 may include at least one program product having a set (e.g., at least one) of program modules that are configured to carry out the functions of embodiments of the invention. A program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via a network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

What is claimed is:

1. An apparatus comprising:
   circuitry configured to implement a neural network and comprising a plurality of unit cells, wherein a given one of the plurality of unit cells comprises one or more static random-access memory cells and a digital to analog converter device, wherein the one or more static random-access memory cells implement an n-bit static-access memory, wherein the digital to analog converter device is configured to receive one or more outputs produced by respective ones of the one or more static random-access memory cells, and wherein the given unit cell further comprises a set of transistors forming at least one cross-coupled inverter and a set of programming transistors coupling the cross-coupled inverter to a set of bit-lines associated with the given unit cell; and
   at least one processor operatively coupled to a memory and configured to:
   initialize weights of the neural network by programming the unit cells;
   determine an amount of error associated with the initialized weights; and
   adjust the initialized weights in response to the amount of error exceeding a threshold amount of error.

2. The apparatus of claim 1, wherein the digital to analog converter device comprises a resistor ladder.

3. The apparatus of claim 2, wherein the resistor ladder is an R-2R resistor ladder.

4. The apparatus of claim 2, wherein the resistor ladder is comprised of a precision resistor material.

5. The apparatus of claim 4, wherein the precision resistor material comprises polysilicon or a back-end-of-line metal.

6. The apparatus of claim 1, wherein the digital to analog converter device comprises a field-effect transistor.

7. The apparatus of claim 1, wherein the n-bit static-access memory is a five bit static-access memory.

8. The apparatus of claim 1, wherein the given unit cell comprises four transistors forming the at least one cross-coupled inverter and two programming transistors coupling the cross-coupled inverter to the set of bit-lines associated with the given unit cell.

9. The apparatus of claim 1, wherein the neural network is a feedforward neural network.

10. The apparatus of claim 9, wherein the neural network is a convolutional neural network.

11. The apparatus of claim 1, wherein the neural network is a recurring neural network.

12. A method for implementing a neural network, the method comprising:
    initializing weights of the neural network by programming a plurality of unit cells, wherein a given one of the plurality of unit cells comprises one or more static random-access memory cells and a digital to analog converter device, wherein the one or more static random-access memory cells implement an n-bit static-access memory, wherein the digital to analog converter device is configured to receive one or more outputs produced by respective ones of the one or more static random-access memory cells, and wherein the given unit cell further comprises a set of transistors forming at least one cross-coupled inverter and a set of programming transistors coupling the cross-coupled inverter to a set of bit-lines associated with the given unit cell;
    determining an amount of error associated with the initialized weights; and
    adjusting the initialized weights in response to the amount of error exceeding a threshold amount of error;
    wherein the steps of the method are implemented by at least one processing device comprising a processor operatively coupled to a memory.

13. The method of claim 12, wherein the digital to analog converter device comprises a resistor ladder.

14. The method of claim 13, wherein the resistor ladder is an R-2R resistor ladder.

15. The method of claim 13, wherein the resistor ladder is comprised of a precision resistor material.

16. The method of claim 12, wherein the digital to analog converter device comprises a field-effect transistor.

17. The method of claim 12, wherein the n-bit static-access memory is a five bit static-access memory.

18. The method of claim 12, wherein the given unit cell comprises four transistors forming the at least one cross-coupled inverter and two programming transistors coupling the cross-coupled inverter to the set of bit-lines associated with the given unit cell.

19. The method of claim 12, wherein the neural network is one of a feedforward neural network and a recurring neural network.

20. An article of manufacture comprising a processor-readable storage medium for storing computer-readable program code which, when executed, causes at least one processor to implement a neural network by performing steps of:
    initializing weights of the neural network by programming a plurality of unit cells, wherein a given one of the plurality of unit cells comprises one or more static random-access memory cells and a digital to analog converter device, wherein the one or more static random-access memory cells implement an n-bit static-access memory, wherein the digital to analog converter device is configured to receive one or more outputs produced by respective ones of the one or more static random-access memory cells, and wherein the given unit cell further comprises a set of transistors forming at least one cross-coupled inverter and a set of programming transistors coupling the cross-coupled inverter to a set of bit-lines associated with the given unit cell;
    determining an amount of error associated with the initialized weights; and
    adjusting the initialized weights in response to the amount of error exceeding a threshold amount of error.

* * * * *